April 15, 1952  H. PRICE ET AL  2,593,179
MEANS FOR ATTACHING FENDER FLAPS
Filed April 25, 1950
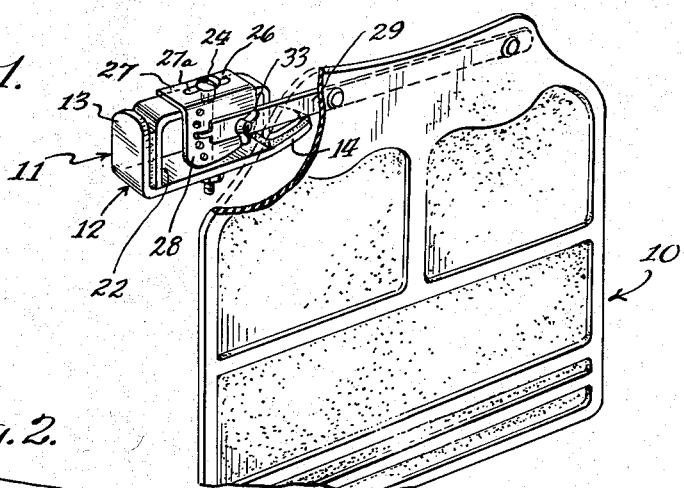
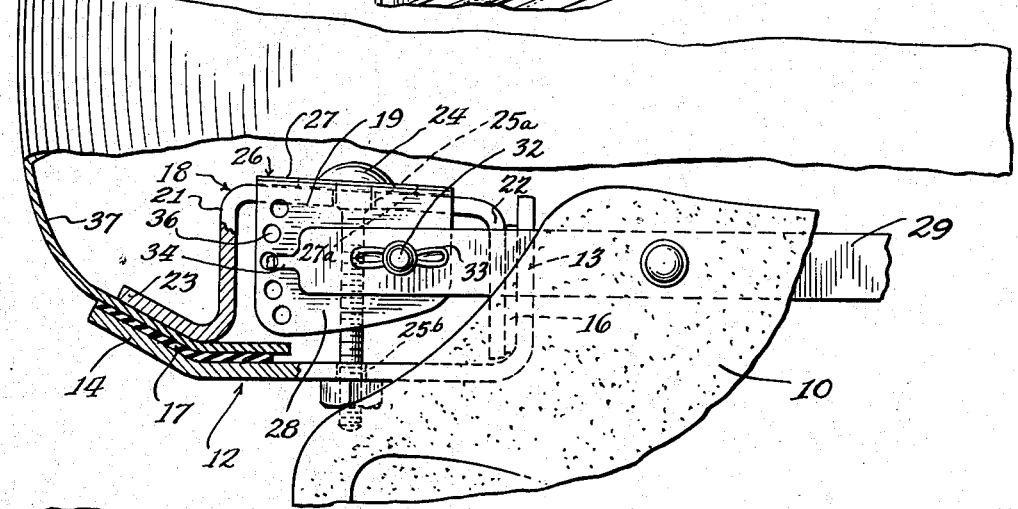
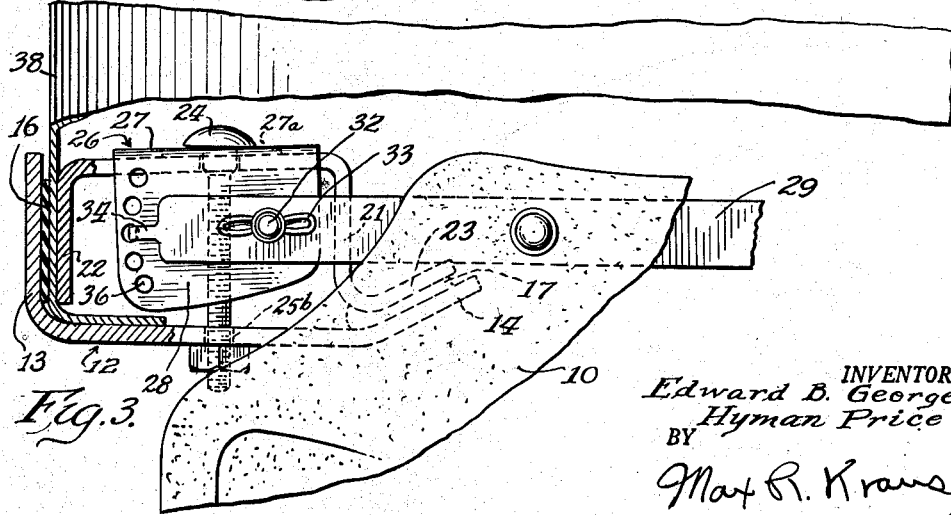
INVENTORS
Edward B. George and
Hyman Price
BY
Max R. Kraus
Atty.

UNITED STATES PATENT OFFICE 2,593,179

MEANS FOR ATTACHING FENDER FLAPS

Hyman Price and Edward B. George, Chicago, Ill., assignors to Hyman Price, Chicago, Ill.

Application April 25, 1950, Serial No. 158,028

7 Claims. (Cl. 280—154.5)

Our invention relates to fender flaps for fenders of automotive vehicles and more particularly to means for attaching the said flaps in operative position.

The present trend toward streamlining automobiles has affected the shapes and contours of the fenders to the end that it is impracticable to attach fender flaps to the rear edges of the fenders in view of the streamlined design of the rear portions of the fenders. This streamlining also renders more difficult the securement of fender flaps to the side walls of the fenders.

Accordingly, it is an object of our invention to provide a fender flap having securing means by which the flap may be readily attached to any one of a variety of contours of fenders so that the fender flap may be made to hang plumb even though the contour of the fender is curved or of any other unusual construction.

A further object of our invention is the provision of a fender flap and a clamping means therefor which may be installed on a fender of an automotive vehicle with a minimum of skill and labor.

A further object of our invention is the provision of a fender flap and attaching means therefor which is simple in construction, durable in service, and relatively economical to manufacture.

Other and further objects and advantages of our invention will become apparent from the foregoing description when considered in connection with the accompanying drawing in which:

Figure 1 is a perspective view showing a fender flap and attaching means associated therewith.

Figure 2 is a fragmentary elevational view partly in section showing the clamping means on an enlarged scale as applied to one type of a fender, parts of which are broken away for purposes of clarification.

Figure 3 is a similar view showing the clamping means in another position of use, as applied to a fender of different contour.

Referring to the drawings wherein is shown a preferred embodiment of my invention, the numeral 10 indicates a flap preferably of rubber attached to and depending from a clamping means, indicated generally by the numeral 11. The said clamping means comprises a lower clamp element 12 having at one end an upstanding arm 13 and at its other end an arm 14 inclined upwardly at an obtuse angle. Rubber pads 16 and 17 are suitably cemented to the inner surfaces of the arms 13 and 14 respectively. A cooperating upper clamp element, indicated generally by the numeral 18, includes a longitudinal portion 19 and depending legs 21 and 22 in substantially parallel relation. The leg 21 has an extending arm 23 inclined substantially like the arm 14. The members 12 and 18 are each formed of relatively stiff metal and are provided with apertures 25a and 25b to receive a bolt and nut 24 which serve to draw the two clamping elements 12 and 18 together to effect a clamping action therebetween, as will be hereinafter described.

Supported on the member 18 is a substantially inverted L shaped bracket 26 provided in the transverse leg 27 with an elongated slot 27a, the said slot being in substantial registration with the apertures 25a and 25b and adapted to receive the bolt 24 which passes through the said apertures. As will be apparent the elongated slot 27a permits longitudinal adjustment of the bracket 26 relative to the elements 18 and 12. The apron 28 of the bracket 26 serves to support an arm 29 upon which is riveted the flap 10. The arm 29 is pivotally secured to the apron 28 by a bolt 32 passing through apertures in the apron 28 and arm 29, the said arm being secured in a position of adjustment by a wing nut 33. The arm 29 is provided at one end thereof with an inwardly turned finger 34 which is adapted to engage in any one of a series of apertures 36 provided in the apron 28 and arranged in arcuate disposition. Thus, it will be apparent that the arm 29 may be pivotally adjusted within the limits of the arc defined by the apertures 36 and locked in a position of adjustment by the wing nut 33. The clamping elements 12 and 18 may be assembled in the arrangements as illustrated in Figures 2 and 3 with respect to the fender flap 10. Thus, either of the cooperating arms, such as 14 and 23 or 13 and 22 may be brought into clamping position to effect engagement with fenders such as 37 and 38. It will be apparent that by removing the bolt 24 the elements 12 and 18 may be rearranged with relation to the arm 29 and supporting bracket 26 so as to permit engagement with any one of several types of fender contours. In the arrangement illustrated in Figure 2, the fender 37 is of such contour that the lower edge thereof is turned inwardly in a relatively large curve. For this type of fender, it is preferable to clamp the fender portion between the inclined arms 14 and 23 with the outer surface of the fender being in engagement with the rubber pad 17 so as not to mar the surface thereof. It will be apparent that when the bolt 24 is tightened up a wedging action between elements 18 and 12 is effected, thus securely gripping the fender 37 between the two arms 14 and 23. It is anticipated that the angular position of the arms 14 and 23 may not satisfy all conditions of fender contour. Accordingly, in order to adjust the flap 10 to plumb position, the arm 29 may be pivoted about its axis and the finger 34 positioned within one of the apertures 36 which would correspond to the position desired. Then when the wing nut 33 is tightened, the arm 29 is held securely against the apron 28 and the finger 34 cannot slip out of the said aperture 36. It will be apparent that the provision of pivotal adjustment of the arm 29 renders the clamp applicable to almost any type of fender contour.

The fender 38 illustrated in Figure 3 has a vertical wall portion and for such a condition it is preferable to clamp the fender between the arms 13 and 22. Similarly, as in the arrangement illustrated in Figure 2, the fender is caused to be securely wedged between the arms 22 and 13 when the bolt 24 is tightened up, since the wedging action is effected as a result of the inclined arms 14 and 23. After the clamping elements have been applied to the fender, the arm 29 is adjusted in the manner hereinabove described so as to position the said arm in horizontal position to obtain a plumb mounting of the fender flap.

It will be apparent from the foregoing that the present invention provides clamping means applicable to a relatively large number of different styles and contours of automobile fenders without modification in construction. It will also be apparent that with the improved clamping means of our invention attachment of a flap to a fender may be made with a minimum of skill and labor since it is necessary to have only one connection with the fender for each flap.

We claim:

1. A clamp for supporting a device on an automobile fender comprising cooperating members each formed of flat metal stock and having two pairs of complemental legs, each pair being of different angular disposition so as to accommodate therebetween fender portions having different contours, means securing said members together whereby the clamp is held rigidly in place on a fender by pressure exerted thereon by a selected pair of legs, a bracket carried on one of said members, an arm pivotally mounted on said bracket, and a device supported on said arm.

2. A clamp according to claim 1 wherein the device to be attached to the vehicle is a fender flap which is suspended from the arm.

3. A clamp for attaching a flap to the fender of a vehicle, including an outer member formed of flat metal stock and having two legs, one of which is substantially vertical and the other of which is inclined outwardly, an inner member formed of flat metal stock and having legs complemental to said first mentioned legs, each pair of complemental legs being adapted for engagement with vehicle fenders having different contours, means securing said members together whereby the clamp is held rigidly in place on said fender by pressure exerted thereon by a selected pair of legs, a bracket carried on one of said members, an arm pivotally mounted on said bracket, and a flap carried on said arm.

4. A clamp for attaching a flap to the fender of a vehicle, including an outer member formed of flat metal stock and having two legs, one of which is substantially vertical and the other of which is inclined outwardly, an inner member formed of flat metal stock and having legs complemental to said first mentioned legs, each pair of complemental legs being adapted for engagement with vehicle fenders having different contours, means securing said members together whereby the clamp is held rigidly in place on said fender by pressure exerted thereon by a selected pair of legs, a bracket carried on one of said members, an arm pivotally mounted on said bracket, a flap carried on said arm, said arm being pivotally adjustable whereby said flap may be adjusted to plumb position, and means for locking said arm in a position of adjustment.

5. A clamp for supporting a device on an automobile fender comprising cooperating members each formed of flat metal stock and having two pairs of complemental legs, each pair being of different angular disposition so as to accommodate therebetween fender portions having different contours, means securing said members together whereby the clamp is held rigidly in place on a fender by pressure exerted thereon by a selected pair of legs, a bracket carried on one of said members, an arm pivotally mounted on said bracket, said bracket having a series of apertures therein, said arm having a finger at one end thereof adapted to secure said arm in a position of adjustment, and a device supported on said arm.

6. A clamp for attaching a flap to the fender of a vehicle comprising upper and lower clamping members, each formed of flat metal stock, said lower member having a substantially vertically disposed leg, an angularly inclined leg and an intermediate portion connecting said legs, said upper member having a pair of legs which are substantially parallel to the respective legs of the lower member, a bracket carried on said upper members, screw means passing through apertures in said upper and lower members for securing said members together whereby the clamp is held rigidly in place on said fender by pressure exerted thereon by selected cooperating legs, an arm pivotally mounted on said bracket, and a flap carried on said arm.

7. A clamp for attaching a flap to the fender of a vehicle comprising upper and lower clamping members, each formed of flat metal stock, said lower member having a substantially vertically disposed leg, an angularly inclined leg and an intermediate portion connecting said legs, said upper member having a pair of legs which are substantially parallel to the respective legs of the lower member, a bracket carried on said upper members, screw means passing through apertures in said upper and lower members for securing said members together whereby the clamp is held rigidly in place on said fender by pressure exerted thereon by selected cooperating legs, an arm pivotally mounted on said bracket, a flap carried on said arm, said arm being pivotally adjustable whereby said flap may be adjusted to plumb position and means for locking said arm in a position of adjustment.

HYMAN PRICE.
EDWARD B. GEORGE.

REFERENCES CITED

The following references are of record in the file of this patent:

UNITED STATES PATENTS

| Number | Name | Date |
|---|---|---|
| 2,084,087 | Jackson | June 15, 1937 |
| 2,124,513 | Bahr | July 19, 1938 |
| 2,243,388 | Magyarosi | May 27, 1941 |